Sept. 15, 1970  H. S. OGDEN ET AL  3,528,554
MULTIPLE ELEMENT, COMPRESSIBLE FILTER ASSEMBLY
Filed May 22, 1968
3 Sheets-Sheet 1
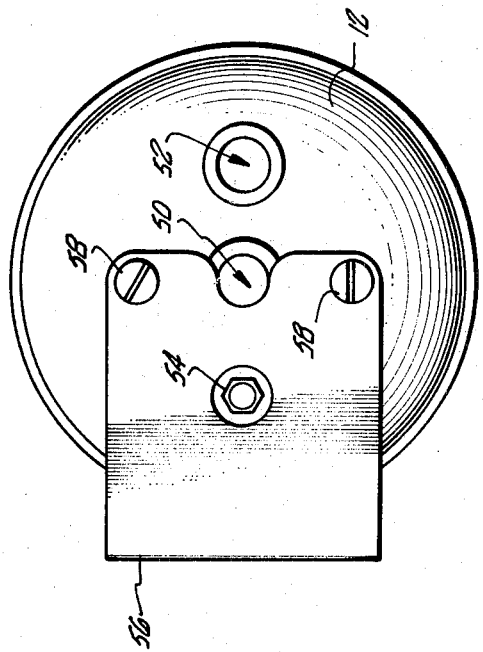
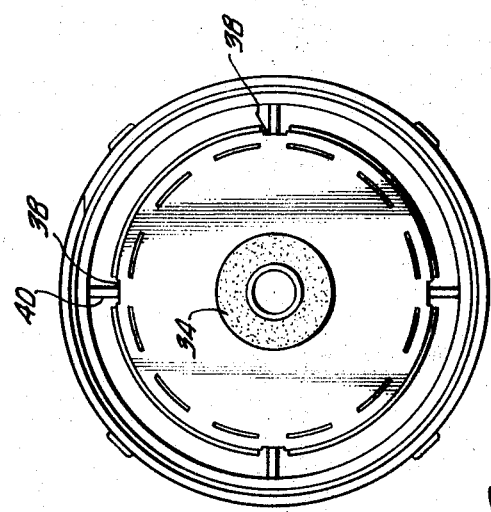
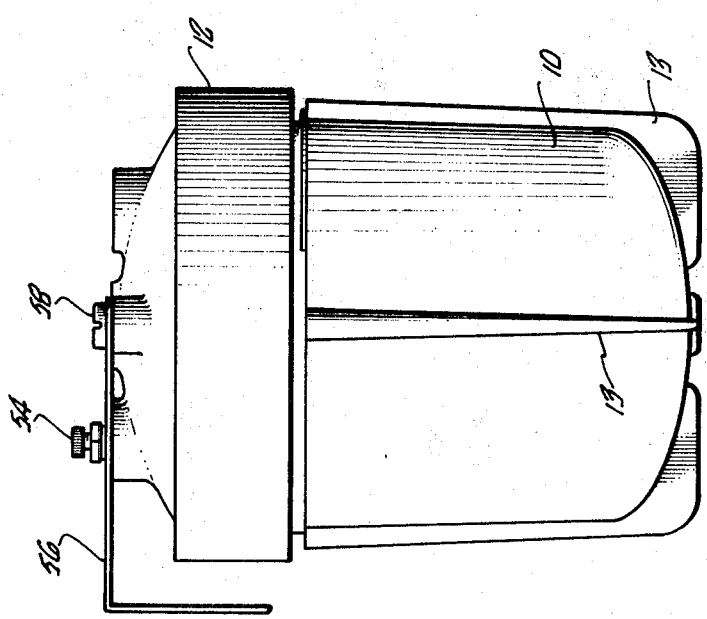
INVENTORS
HUBERT S. OGDEN
STANLEY D. OGDEN
BY Jackson + Jones
ATTORNEYS

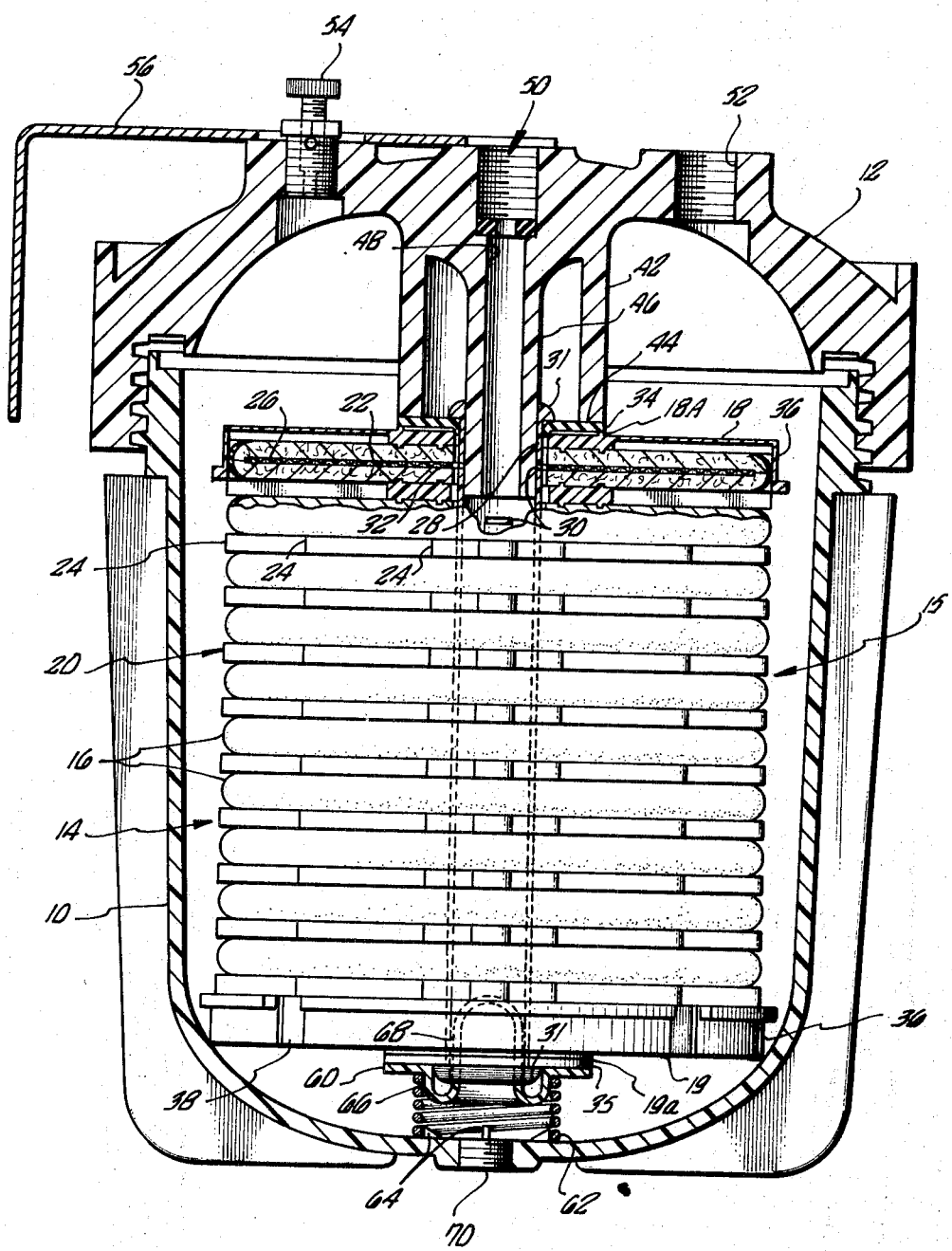

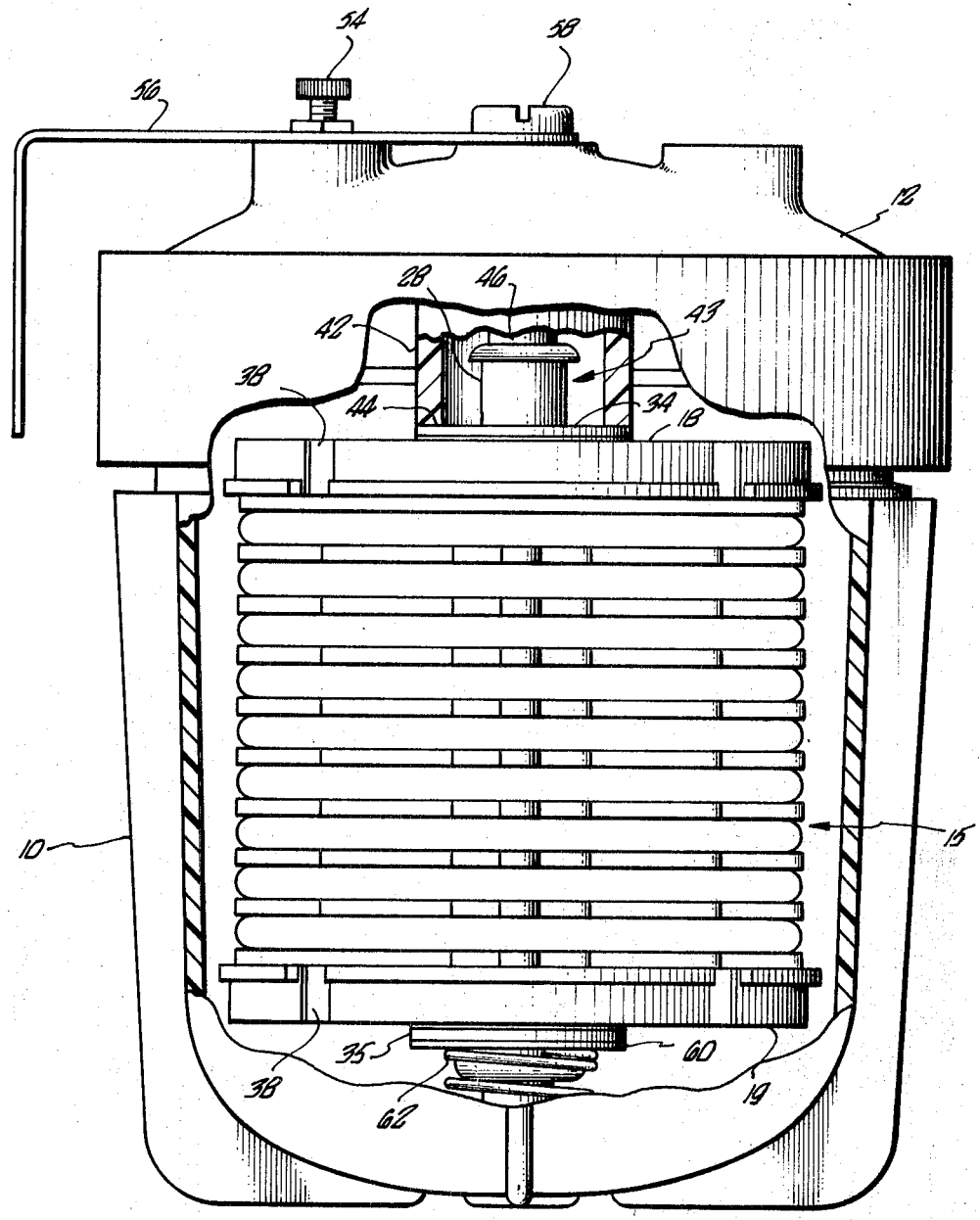

United States Patent Office 3,528,554
Patented Sept. 15, 1970

3,528,554
MULTIPLE ELEMENT, COMPRESSIBLE
FILTER ASSEMBLY
Hubert S. Ogden, Hollywood, and Stanley D. Ogden, Glendale, Calif., assignors to Ogden Filter Co., Inc., Los Angeles, Calif., a corporation of California
Filed May 22, 1968, Ser. No. 731,173
Int. Cl. B01d 29/34
U.S. Cl. 210—343                3 Claims

ABSTRACT OF THE DISCLOSURE

A container is provided for holding a replaceable filter cartridge of the type which includes a plurality of annular filter pads surrounding a perforated open ended sleeve and stacked between a pair of annular compression plates. The container is formed by a top cover plate which includes an annular surface for engaging one of the cartridge compression plates. A closure plate is fastened by means of a spring to force the closure plate against the bottom compression plate of the cartridge to compress the filter pads and prevent the leakage of unfiltered liquid into the cartridge sleeve. The cover plate defines a recess within the annular surface to accommodate the portion of the sleeve which extends beyond the compressed filter pads.

BACKGROUND OF THE INVENTION

The present invention relates to fluid filtering devices and more particularly to a container for holding a replaceable filter cartridge. Replaceable filter cartridges are used in a wide variety of applications to filter foreign matter and other contamination from liquids or gases. The present invention is particularly adapted for housing a filter cartridge which is used to purify drinking water. One such cartridge is distributed by the Ogden Filter Co., Inc., and comprises a plurality of annular filter pads surrounding a perforated open ended sleeve and stacked between a pair of annular compression plates. The filter pads are formed of conventional fibrous filtering material and contract upon contact with water under pressure. Untreated water passes through the exterior surface of the filter pads, through a centrally disposed screen and then into the open ended sleeve where the filtered water is drained. The cartridge housing or container must provide a liquid seal between the portion of the annular compression plates and the filter pads which surround the perforated sleeve to insure that contaminated water can not flow into the perforated sleeve without passing through one of the filter pads.

In the past the sealing function has been performed by a pair of thick rubber washers placed on each end of the cartridge within the housing. The filter pads are initially compressed between the rubber washers during assembly of the container. In operation, the rubber washers expand to accommodate the contraction of the filter pads in response to the water under pressure.

The thick rubber washers are, however, expensive and must be replaced from time to time to insure against contamination of the drinking water. Furthermore, the prior art containers are difficult and time consuming to assemble and must be designed for a maximum inlet water pressure. The present invention provides a simple and inexpensive container for replaceable filter cartridges which is easy to assemble and is not dependent upon a maximum pressure to insure a liquid seal contact between the filter pads or compression plates at each extremity of the cartridge assembly and the chamber surrounding the filter pads.

SUMMARY OF THE INVENTION

In accordance with the present invention a holder or container is provided for holding a replaceable filter cartridge of the type that comprises a plurality of annular filter pads surrounding a perforated open ended sleeve and disposed between a pair of annular compression plates. The cartridge holder includes a pair of detachable housing members enclosing a chamber for receiving the filter cartridge. One of the housing members includes an annular surface for engaging one of the cartridge compression plates. A closure member is mounted for longitudinal movement within the other housing member and includes a top surface adapted to engage the other cartridge compression plate to prevent leakage of liquid from the chamber into the cartridge sleeve. The bottom surface of the closure member is exposed to the liquid within the chamber for compressing the filter pads. A recess is provided within the annular surface of said one housing member or the top surface of the closure member to receive the cartridge sleeve when the filter pads are compressed in response to liquid pressure within the chamber. Spring means are provided for biasing the closure member into engagement with the compression plate. The invention is described in more detail in reference to the accompanying drawings.

BRIEF DESCRIPTION OF THE DRAWINGS

FIG. 1 is an elevation showing a container embodying the present invention;
FIG. 2 is a top plan view of the container shown in FIG. 1;
FIG. 3 is a top plan view of the container shown in FIG. 1 with the top cover plate removed;
FIG. 4 is a sectional view of the container shown in FIG. 1; and
FIG. 5 is an elevation view of the container shown in FIG. 1, partially broken away to show the contraction of filter pads in response to liquid pressure within the container.

DESCRIPTION OF THE PREFERRED EMBODIMENT

Referring now to the drawings, the container includes a bottom housing member or bowl 10 threadably secured to a top housing member or cover plate 12. External ribs 13 hold the container in an upright position on a horizontal surface.

A replaceable filter cartridge 14 is carried within the container as shown in FIG. 4. The cartridge 14 includes a plurality of filter pads 16 stacked between a pair of annular compression plates 18 and 19. Between each of the filter pads 16 there is placed a spacer 20 having an annular hub 22 and a plurality of radially extending arms 24. The spacers 20 expose a very substantial portion of the exterior surface of the filter pads 16 to the liquid within the chamber 15. Each of the filter pads includes a screen 26 disposed in the interior thereof for draining purified water that has passed through the pads into a centrally disposed free sleeve 28 having perforations illustrated at 30. The filter pads have a central opening 32 so that they readily slide over the sleeve 28.

The filter cartridge 15 further includes a top annular sealing member 34 which may be in the form of a rubber washer disposed between the top compression plate 18 and an enlarged head portion 31 of the perforated sleeve 28. The compression plate 18 is provided with an annular lip 18A which engages the bottom surface of the rubber washer 34. A second sealing member or washer 35 is also disposed between the bottom compression plate 19 and the lower head 31 of the sleeve 28 as shown. The bottom compression plate 19 also includes an annular lip 19A which engages the sealing member 35. Each of the compression plates includes a flange 36 provided with spaced grooves 38 for slidably engaging inwardly extending ribs 40 of the lower housing member 10, see FIG. 3. The ribs 40 and grooves 38 merely serve to position the cartridge within the bowl 10.

The upper housing member 12 has an outer ring 42 extending inwardly from the top thereof and terminating in an annular surface 44 which engages the sealing member 34. A centrally disposed inner tube 46 extends within the outer ring 42 and slidably engages the interior surface of the perforated sleeve 28. The tube 46 is provided with a central bore 48 terminating in a threaded outlet port 50 for draining purified water from the interior of the cartridge unit. An annular recess 43 extends within the annular surface 44 between the ring 42 and the tube 46 for receiving the cartridge sleeve as shown in FIG. 4. The upper housing defines a threaded inlet opening 52 for receiving water to be purified under suitable pressure. A conventional air relief valve 54 is also disposed within the cover plate 12. A mounting bracket 56 is mounted on the cover plate by screws 58 to permit the cartridge container to be suitably mounted on a wall or other suitable surface.

A closure member or plate 60 is mounted for longitudinal movement within the bowl 10 by means of a helical spring 62. The helical spring 62 is slidably mounted over circularly spaced tabs 64 formed integrally with the bowl 10. The closure plate 60 includes a downwardly extending flange 66 which engages the spring 62 as shown. The plate 60 also includes an upwardly extending cylindrical plug 68 which is slidably received in the perforated sleeve 28. A drain plug 70 is provided in the bottom of the bowl 10.

Referring now to FIG. 5, the filter cartridge is shown in its operative position with water under pressure within the chamber 15. The water under pressure causes the filter pads to contract and also urges the closure plate 60 against the bottom sealing washer 35. This action raises the lower compression plate 19 forcing the top of the tube 28 into the recess 43 and insuring a compressive seal between the annular surface 44 and the sealing washer 34. The water under pressure also forces the bottom of the sleeve 28 into the small recess in the closure plate 60 which surrounds the plug 68. The higher the liquid pressure within the chamber 15, the greater the sealing pressure on the sealing rings 34 and 35. Thus contaminated water is prevented from entering the outlet 50.

A simple, inexpensive and reliable filter cartridge container has been described. To replace the cartridge, the cover plate need simply be unscrewed and a new cartridge inserted on the closure member 60. A filter cartridge may be placed with either side up in the container. Replacing the cover plate 12 compresses the spring 62 insuring adequate sealing pressure for the filter pads at low and high water pressures. Various modifications may be made in the preferred embodiment without departing from the scope of the present invention. For example, the closure plate 60 may be provided with a recess to receive the portion of the perforated sleeve 28 which extends beyond the compressed filter pads. The resilient sealing member may also be carried by the container instead of the cartridge if desired. Other modifications will be evident to those skilled in the art.

What is claimed is:
1. In a liquid filtering device for holding a replaceable filter cartridge of the type that comprises a plurality of annular filter pads disposed between a pair of annular compression plates surrounding a perforated open ended cartridge sleeve and an annular cartridge sealing member disposed around the sleeve in contact with the exterior surface of each compression plate the combination which comprises:

a pair of detachable housing members forming an enclosed chamber for receiving the filter cartridge, one of the housing members including an annular surface for engaging one of the cartridge sealing members and defining a recess within the annular surface for receiving the cartridge sleeve, said one housing member further including a cylindrical guide tube having one end disposed within the recess and the other end extending beyond the annular surface in the direction of said other housing member, the guide tube being arranged to slidably engage the interior surface of the cartridge sleeve, said one housing member further defining an outlet opening in fluid communication with the passage in said tube, a closure member having a top and bottom surface mounted for longitudinal movement within the other housing member, the top surface of the closure member being arranged to engage the other cartridge sealing member to prevent leakage of liquid from the chamber into the cartridge sleeve, the bottom surface of the closure member being exposed to the liquid within the chamber for compressing the filter pads and forcing the sleeve into the recess in said one housing member in response to liquid pressure in the chamber, and spring means coupled between said other housing member and the closure member for biasing the closure member into engagement with said other sealing member.

2. The combination as defined in claim 1 wherein the closure member includes an annular top surface for engaging the other cartridge sealing member and a centrally disposed cylindrical plug extending beyond the annular surface in the direction of said one housing member to engage the interior of the cartridge sleeve.

3. The combination as defined in claim 2 wherein the spring means comprises a coil spring.

References Cited
UNITED STATES PATENTS

| | | | |
|---|---|---|---|
| 2,304,618 | 12/1942 | Williams | 210—347 |
| 2,592,527 | 4/1952 | Armstrong | 210—347 |
| 2,592,528 | 4/1952 | Failmezger | 210—347 |
| 2,874,849 | 2/1959 | Browne et al. | 210—347 |

REUBEN FRIEDMAN, Primary Examiner

F. A. SPEAR, Jr., Assistant Examiner

U.S. Cl. X.R.

210—345, 347, 352, 356